US012767124B2

(12) United States Patent
Sun

(10) Patent No.: US 12,767,124 B2
(45) Date of Patent: Oct. 20, 2026

(54) METHOD FOR AVOIDING COLLISION OF VEHICLE, AND APPARATUS FOR PERFORMING THE METHOD

(71) Applicant: HL KLEMOVE CORP., Incheon (KR)

(72) Inventor: Ilgyu Sun, Incheon (KR)

(73) Assignee: HL KLEMOVE CORP., Incheon (KR)

( * ) Notice: Subject to any disclaimer, the term of this patent is extended or adjusted under 35 U.S.C. 154(b) by 238 days.

(21) Appl. No.: 18/637,422

(22) Filed: Apr. 16, 2024

(65) Prior Publication Data

US 2025/0206292 A1 Jun. 26, 2025

(30) Foreign Application Priority Data

Dec. 20, 2023 (KR) ........................ 10-2023-0186719

(51) Int. Cl.
*B60W 30/09* (2012.01)
*B60W 30/095* (2012.01)

(52) U.S. Cl.
CPC .......... *B60W 30/09* (2013.01); *B60W 30/095* (2013.01); *B60W 2420/403* (2013.01); *B60W 2420/408* (2024.01); *B60W 2552/50* (2020.02); *B60W 2554/80* (2020.02)

(58) Field of Classification Search
CPC .... B60W 30/09; B60W 30/095; B60W 30/12; B60W 30/18; B60W 30/182
See application file for complete search history.

(56) References Cited

U.S. PATENT DOCUMENTS

2022/0111847 A1* 4/2022 Jung ................. B60W 30/0956
2022/0234581 A1* 7/2022 Kim .................. B60W 30/0956
2025/0065866 A1* 2/2025 Kim ...................... B60W 30/09

FOREIGN PATENT DOCUMENTS

KR 10-2016-0141285 12/2016
KR 20160141285 A * 12/2016 ............ B60W 30/09
KR 10-2019-0115676 10/2019
KR 10-2020-0140979 12/2020
KR 10-2022-0049640 4/2022

OTHER PUBLICATIONS

Office Action dated Sep. 16, 2025 for Korean Patent Application No. 10-2023-0186719 and its English translation provided by Applicant's foreign counsel.

* cited by examiner

*Primary Examiner* — Luke Huynh
(74) *Attorney, Agent, or Firm* — WOMBLE BOND DICKINSON (US) LLP

(57) ABSTRACT

A method for avoiding a collision of a vehicle, an apparatus for performing the method, and a computer program avoid a collision with an object positioned at a rear side or a side of an ego vehicle, which is a blind zone area when the ego vehicle turns, to prevent a side collision accident which may occur in a blind zone up turning driving, and determines a collision risk based on prestored surrounding object information upon restarting a vehicle to prevent the side collision accident due to carelessness of a driver upon driving after restarting of the vehicle.

12 Claims, 7 Drawing Sheets

METHOD FOR AVOIDING COLLISION OF VEHICLE, AND APPARATUS FOR PERFORMING THE METHOD

CROSS-REFERENCE TO RELATED APPLICATIONS

This application claims benefit and priority to Korean Patent Application No. 10-2023-0186719, filed on Dec. 20, 2023, with the Korean Intellectual Property Office, the disclosure of which is incorporated herein in its entirety by reference.

TECHNICAL FIELD

The present disclosure relates to a method for avoiding a collision of a vehicle, and an apparatus for performing the method.

BACKGROUND

When a vehicle turns or parks on a narrow road, a side area of the vehicle is a blind zone for a driver. In particular, when there is a sidewalk near the vehicle and a height of a curb is high, a side of the vehicle is risk of conflicting with the curb. In addition, a commercial vehicle has a wider rotation radius than a passenger car, and when the vehicle turns, a movement area is wider than that of the passenger car. In particular, when the commercial vehicle turns right at an intersection, there is a risk of a conflict with an object approaching from the rear right or a pedestrian near the intersection.

SUMMARY

In view of the above, an embodiment of the present disclosure provides a method for avoiding a collision of a vehicle, and an apparatus for performing the method, which avoid a collision with an object which is positioned at a rear side or a side of an ego vehicle, which is a blind zone area when the ego vehicle turns.

However, it is to be understood that the object to be achieved by the present disclosure is not limited to the above object and may be variously extended without departing from the spirit and scope of the present disclosure.

According to an embodiment of the present disclosure, a method for avoiding a collision of a vehicle includes: acquiring, when an ego vehicle turns, movement prediction path information for a side surface of the ego vehicle; acquiring surrounding object information for a surrounding object positioned near the ego vehicle; determining a collision risk between the ego vehicle and the surrounding object based on the movement prediction path information and the surrounding object information; and actuating a braking device of the ego vehicle when it is determined that there is the collision risk between the ego vehicle and the surrounding object.

Here, the acquiring of the movement prediction path information may be made by predicting a movement radius of the ego vehicle based on a sensor signal of the ego vehicle, and acquiring the movement prediction path information for each of a left surface and a right surface of the ego vehicle by using specification information of the ego vehicle based on the movement radius.

Here, the acquiring of the surrounding object information may be made by acquiring the surrounding object information through a front detection sensor and a side detection sensor mounted on the ego vehicle.

Here, the acquiring of the surrounding object information may be made by identifying a road boundary structure which is the surrounding object by using the front detection sensor and the side detection sensor, and acquiring the surrounding object information including a location and a height for the identified road boundary structure.

Here, the acquiring of the surrounding object information may be made by identifying the other vehicle or a person which is the surrounding object by using the front detection sensor and the side detection sensor, and acquiring the surrounding object information including a future movement path of the other vehicle or the person which is identified.

Here, the determining of the collision risk may be made by determining whether there is a risk that the ego vehicle will collide with the surrounding object in the future by using the surrounding object information for the surrounding object closest to the ego vehicle based on the movement prediction path information for each of a left surface and a right surface of the ego vehicle.

Here, the determining of the collision risk may be made by determining, when the surrounding object closest to the ego vehicle is positioned at a left side of the ego vehicle, whether there is the risk that the ego vehicle will collide with the surrounding object in the future based on the movement prediction path information and the surrounding object information for the left surface of the ego vehicle, and determining, when the surrounding object closest to the ego vehicle is positioned at a right side of the ego vehicle, whether there is the risk that the ego vehicle will collide with the surrounding object in the future based on the movement prediction path information and the surrounding object information for the right surface of the ego vehicle.

Here, the determining of the collision risk may be made by determining, when the surrounding object closest to the ego vehicle is positioned at the left side of the ego vehicle, whether there is the risk that the ego vehicle will collide with the surrounding object in the future based on the movement prediction path information and the surrounding object information for the left surface of the ego vehicle when the ego vehicle turns in a left direction, and determining that there is no collision risk without separately determining whether there is the risk that the ego vehicle will collide with the surrounding object in the future when the ego vehicle turns in a right direction, and determining, when the surrounding object closest to the ego vehicle is positioned at the right side of the ego vehicle, whether there is the risk that the ego vehicle will collide with the surrounding object in the future based on the movement prediction path information and the surrounding object information for the right surface of the ego vehicle when the ego vehicle turns in the right direction, and determining that there is no collision risk without separately determining whether there is the risk that the ego vehicle will collide with the surrounding object in the future when the ego vehicle turns in the left direction.

Here, the acquiring of the surrounding object information may be made by storing the surrounding object information corresponding to a time when a start of the ego vehicle is turned off when the start of the ego vehicle is turned off, and acquiring, when the ego vehicle is restarted, the surrounding object information by loading the stored surrounding object information without separately performing an operation of acquiring the surrounding object information for the surrounding object positioned near the ego vehicle.

Here, the actuating of the braking device may be made by additionally actuating a rear wheel steering device of the ego vehicle when it is determined that there is the collision risk between the ego vehicle and the surrounding object.

Here, the actuating of the braking device may be made by actuating the rear wheel steering device so that a rear wheel direction of the ego vehicle is opposite to a front wheel direction of the ego vehicle.

According to an embodiment of the present disclosure, an apparatus includes: a memory storing one or more programs for avoiding a collision of a vehicle; and one or more processors performing an operation of avoiding the collision of the vehicle according to one or more programs stored in the memory, and the processor may acquire, when an ego vehicle, movement prediction path information for a side surface of the ego vehicle, acquire surrounding object information for a surrounding object positioned near the ego vehicle, determine a collision risk between the ego vehicle and the surrounding object based on the movement prediction path information and the surrounding object information, and actuate a braking device of the ego vehicle when it is determined that there is the collision risk between the ego vehicle and the surrounding object.

Here, the processor may predict a movement radius of the ego vehicle based on a sensor signal of the ego vehicle, and acquire the movement prediction path information for each of a left surface and a right surface of the ego vehicle by using specification information of the ego vehicle based on the movement radius.

Here, the processor may acquire the surrounding object information through a front detection sensor and a side detection sensor mounted on the ego vehicle.

Here, the processors may identify a road boundary structure which is the surrounding object by using the front detection sensor and the side detection sensor, and acquire the surrounding object information including a location and a height for the identified road boundary structure.

Here, the processor may identify the other vehicle or a person which is the surrounding object by using the front detection sensor and the side detection sensor, and acquire the surrounding object information including a future movement path of the other vehicle or the person which is identified.

Here, the processor may determine whether there is the risk that the ego vehicle will collide with the surrounding object in the future by using the surrounding object information for the surrounding object closest to the ego vehicle based on the movement prediction path information for each of the left surface and the right surface of the ego vehicle.

Here, the processor may determine, when the surrounding object closest to the ego vehicle is positioned at a left side of the ego vehicle, whether there is the risk that the ego vehicle will collide with the surrounding object in the future based on the movement prediction path information and the surrounding object information for the left surface of the ego vehicle, and determine, when the surrounding object closest to the ego vehicle is positioned at a right side of the ego vehicle, whether there is the risk that the ego vehicle will collide with the surrounding object in the future based on the movement prediction path information and the surrounding object information for the right surface of the ego vehicle.

Here, the processor may determine, when the surrounding object closest to the ego vehicle is positioned at the left side of the ego vehicle, whether there is the risk that the ego vehicle will collide with the surrounding object in the future based on the movement prediction path information and the surrounding object information on the left surface of the ego vehicle when the ego vehicle turns in a left direction, and determine that there is no collision risk without separately determining whether there is the risk that the ego vehicle will collide with the surrounding object in the future when the ego vehicle turns in a right direction, and determine, when the surrounding object closest to the ego vehicle is positioned at the right side of the ego vehicle, whether there is the risk that the ego vehicle will collide with the surrounding object in the future based on the movement prediction path information and the surrounding object information on the right surface of the ego vehicle when the ego vehicle turns in the right direction, and determine that there is no collision risk without separately determining whether there is the risk that the ego vehicle will collide with the surrounding object in the future when the ego vehicle turns in the left direction.

Here, the processor may store the surrounding object information corresponding to a time when a start of the ego vehicle is turned off when the start of the ego vehicle is turned off, and acquire, when the ego vehicle is restarted, the surrounding object information by loading the stored surrounding object information without separately performing an operation of acquiring the surrounding object information for the surrounding object positioned near the ego vehicle.

According to an embodiment of the present disclosure, a collision with an object positioned at a rear side or a side of an ego vehicle, which is a blind zone area, is avoided when the ego vehicle turns to prevent a side collision accident which may occur in a blind zone upon turning driving, and a collision risk is determined based on prestored surrounding object information upon restarting a vehicle to prevent the side collision accident due to carelessness of a driver upon driving after restarting of the vehicle.

The effects of various embodiments of the present disclosure are not limited to the described effects, and it is apparent to those skilled in the art that various effects are inherent in the present disclosure.

DETAILED DESCRIPTION

Figure 1:
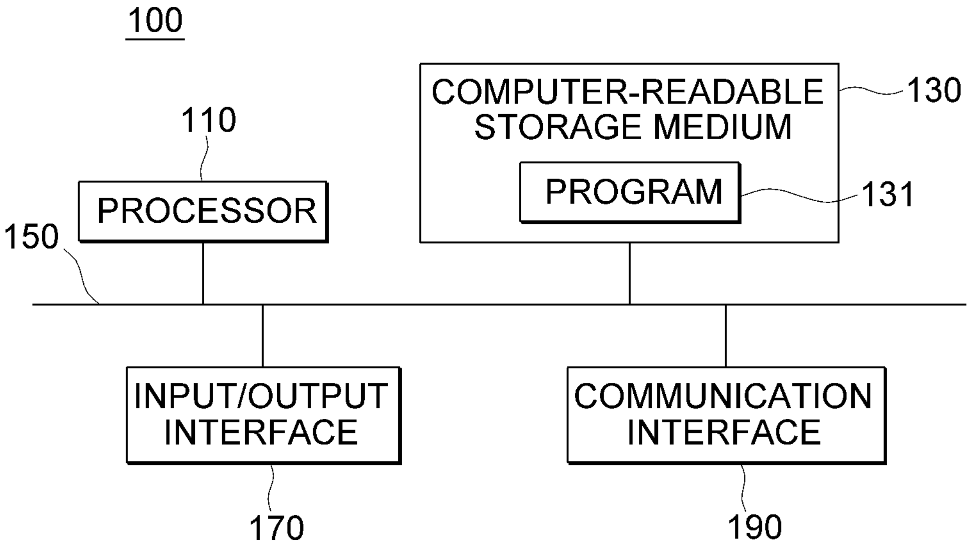
FIG. 1 is a block diagram for describing an apparatus according to an embodiment of the present disclosure.

Hereinafter, an embodiment of the present disclosure will be described in detail with reference to the accompanying drawings. Advantages and features of the present disclosure, and methods for accomplishing the same will be more clearly understood from contents described in detail below with reference to the accompanying drawings. However, the embodiment of the present disclosure not be limited to the embodiments posted below, but can be implemented in different forms, and the embodiments of the present disclosure are defined by the category of the claim.

Throughout the whole specification, the same reference numerals denote the same elements. Unless otherwise defined, all terms (including technical and scientific terms) used in this specification may be used as the meaning which may be commonly understood by a person with ordinary skill in the art, to which the present disclosure pertains. Further, terms defined in commonly used dictionaries should not be interpreted in an idealized or excessive sense unless expressly and specifically defined.

In this specification, the terms "first," "second,", and the like are used to differentiate a certain component from other components, but the scope should not be construed to be limited by the terms. For example, a first component may be referred to as a second component, and similarly, the second component may be referred to as the first component.

In this specification, in each step, reference numerals (e.g., a, b, c, etc.) are used for convenience of description, the reference numerals are not used to describe the order of the steps and unless otherwise stated, steps may occur differently from the order specified. That is, the respective steps may be performed similarly to the specified order, performed substantially simultaneously, and performed in an opposite order.

In this specification, expressions such as "have", "can have", "include", "can include", etc. indicate the presence of the corresponding features (e.g., components such as, numerical value, function, operation, or element), and do not exclude the presence of an additional feature.

Hereinafter, a method for avoiding a collision of a vehicle and an apparatus for performing the method according to an embodiment of the present disclosure will be described in detail with reference to the accompanying drawings.

First, the apparatus according to an embodiment of the present disclosure will be described with reference to FIG. 1.

FIG. 1 is a block diagram for describing an apparatus according to an embodiment of the present disclosure.

Referring to FIG. 1, the apparatus 100 according to an embodiment of the present disclosure is mounted on an ego vehicle to determine a collision risk with a surrounding object positioned in a blind zone area when the ego vehicle turns.

Here, the ego vehicle may be a four-wheel car such as a passenger car, a commercial vehicle, etc.

In addition, the surrounding object may be a road boundary structure such as a curb, a guiderail, grass, etc., other vehicles such as a four-wheel vehicle such as the passenger car, the commercial vehicle, etc., and a two-wheel vehicle such as a bicycle, a motorcycle, etc., a person, etc. The road boundary structure may include a barrier type structure which is a structure having a height difference from a road surface of a driving road, such as the curb, the guiderail, etc., and a road edge type structure which is a structure having no height difference from the road surface of the driving road, such as grass, gravel, etc., formed on the outside of the driving road.

To this end, the apparatus 100 may include one or more processors 110, a computer-readable storage medium 130, and a communication bus 150.

The processor 110 may control the apparatus 100 to operate. For example, the processor 110 may execute one or more programs 131 stored in the computer-readable storage medium 130. One or more programs 131 may include one or more computer-executable instructions, and when the computer-executable instructions are executed by the processor 110, the computer-executable instructions may be configured to allow the apparatus 100 to perform an operation for avoiding the collision of the vehicle.

The computer-readable storage medium 130 may be configured to store a computer-executable instruction or program code, program data, and/or other appropriate type of information for avoiding the collision of the vehicle. The program 131 stored in the computer-readable storage medium 130 includes a set of instructions executable by the processor 110. In an embodiment, the computer-readable storage medium 130 may be a memory (a volatile memory such as a random access memory, a non-volatile memory, or an appropriate combination thereof), one or more magnetic disk storage devices, optical disk storage devices, flash memory devices, other types of storage medium accessed by the apparatus 100 and capable of storing desired information, or appropriate combinations thereof.

The communication bus 150 includes the processor 110 and the computer-readable storage medium 130 to interconnect various other components of the apparatus 100.

The apparatus 100 may also include one or more input/output interfaces 170 that provide interfaces for one or more input/output devices and one or more communication interfaces 190. The input/output interface 170 and the communication interface 190 are connected to the communication bus 150. An input/output device (not illustrated) mounted in a vehicle may be connected to other components of the apparatus 100 through the input/output interface 170. For example, the input/output device may include a front detection sensor mounted on a front surface of the vehicle, a rear detection sensor mounted on a rear surface of the vehicle, a side detection sensor mounted on at least one side surface of the vehicle, a braking device decelerating the vehicle or suppressing a speed, a front wheel steering device changing a front wheel steering direction of the vehicle, a rear wheel steering device changing a rear wheel steering direction of the vehicle, etc. Here, the detection sensor may be a camera sensor, a radar sensor, a LiDAR sensor, etc.

Meanwhile, the apparatus 100 according to an embodiment of the present disclosure is implemented as an independent separate module and mounted in the vehicle, and may perform a method for avoiding the collision of the vehicle by receiving vehicle information from an electronic control unit (ECU) of the vehicle. Of course, the method for avoiding the collision of the vehicle may be implemented in a software form, and mounted in the vehicle, and the ECU of the vehicle may also perform the method. In this case, the ECU of the vehicle may serve as the processor 110 of the apparatus 100 according to an embodiment of the present disclosure.

Then, a method for avoiding a collision of a vehicle according to an embodiment of the present disclosure will be described with reference to FIG. 2.

Figure 2:
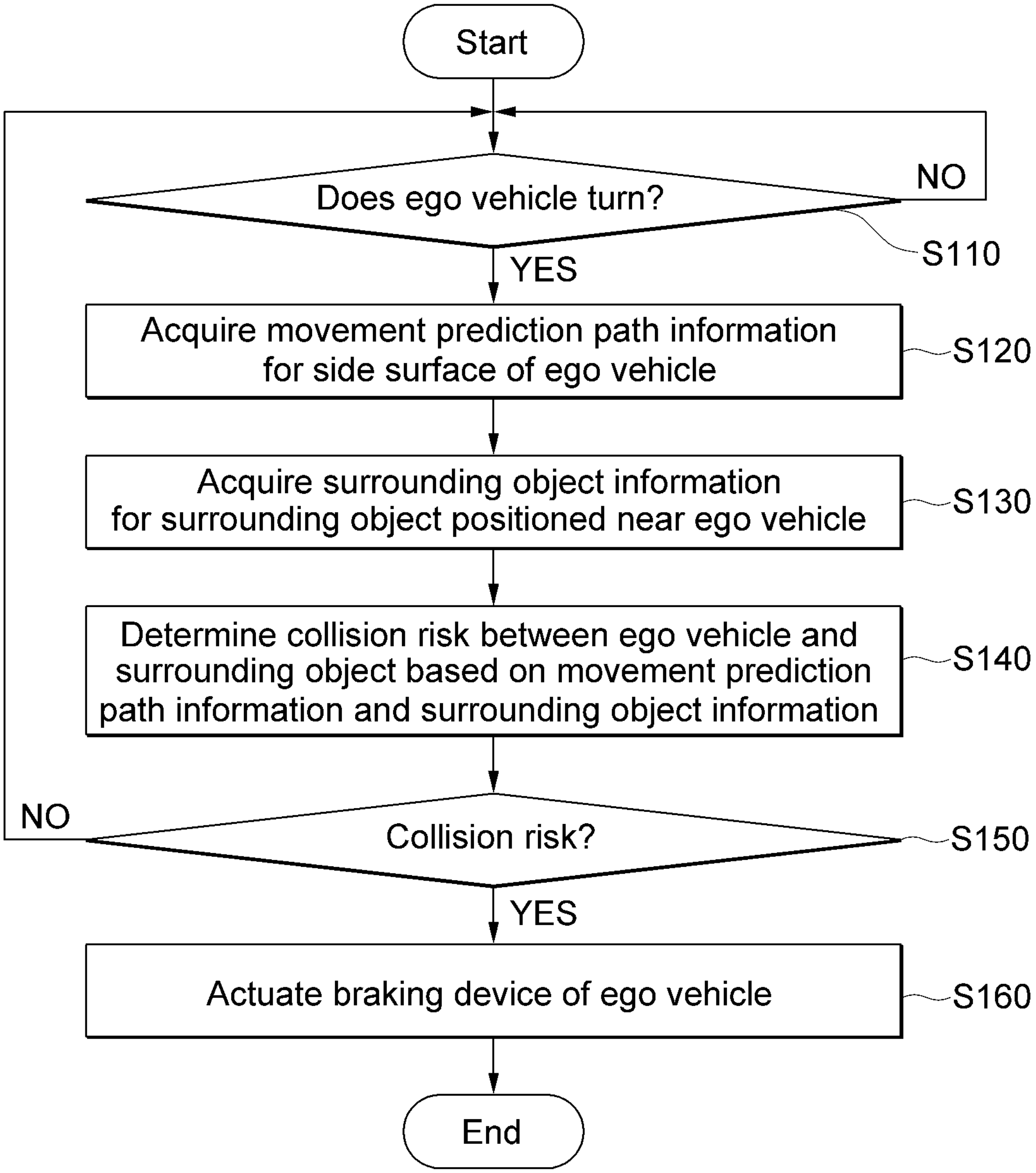
FIG. 2 is a flowchart for describing a method for avoiding a collision of a vehicle according to an embodiment of the present disclosure.

FIG. 2 is a flowchart for describing a method for avoiding a collision of a vehicle according to an embodiment of the present disclosure.

Referring to FIG. 2, when an ego vehicle turns (S110-Y), the processor 110 of the apparatus 100 may acquire movement prediction path information for a side surface of the ego vehicle (S120).

That is, the processor 110 may predict a movement radius of the ego vehicle based on a sensor signal of the ego vehicle. Here, the sensor signal may include a front-wheel angle (SAS angle) a rear wheel angle, a yaw rate, a wheel speed, etc. For example, the processor 110 may predict the movement radius of the ego vehicle by using a wheel base of the ego vehicle based on the sensor signal of the ego vehicle.

In addition, the processor 110 may acquire the movement prediction path information for each of a left surface and a right surface of the ego vehicle by using specification information of the ego vehicle based on the movement radius. Here, the specification information may include a wheel base, a vehicle length, a vehicle width, a vehicle height, a front overhang, etc. For example, the processor 110 predicts a movement path of a left end of a front bumper of the ego vehicle to acquire the movement prediction path information for the left surface of the ego vehicle, and predicts a movement path of a right end of the front bumper of the ego vehicle to acquire movement prediction path information for the right surface of the ego vehicle, by using the specification information based on the predicted movement radius of the ego vehicle.

Then, the processor 110 may acquire surrounding object information for a surrounding object positioned near the ego vehicle (S130).

That is, the processor 110 may acquire the surrounding object information through a front detection sensor and a side detection sensor mounted on the ego vehicle.

When described in more detail, the processor 110 may identify a road boundary structure which is the surrounding object by using the front detection sensor and the side detection sensor, and acquire surrounding object information including a location and a height for the identified road boundary structure. For example, the processor 110 may identify the road boundary structure near a driving road at which the ego vehicle is positioned by using the front detection sensor (i.e., a front camera sensor mounted on the front surface of the vehicle, etc.). In addition, the processor 110 may measure a location of the road boundary structure through the front camera sensor with respect to a road boundary structure positioned in a long range based on the ego vehicle, and measure a location of the road boundary structure through the side detection sensor (i.e., the side camera sensor mounted on the side surface of the vehicle, etc.) with respect to a road boundary structure positioned in a short range based on the ego vehicle. Further, the processor 110 may measure a height of the road boundary structure through the side detection sensor (i.e., a side radar sensor mounted on the side surface of the vehicle) with respect to the road boundary structure positioned in the short range without performing a separate height measurement operation with respect to the road boundary structure positioned in the long range.

Further, the processor 110 may identify the other vehicle or the person which is the surrounding object by using the front detection sensor and the side detection sensor, and acquire surrounding object information including a future movement path of the identified other vehicle or person. For example, the processor 110 may identify the other vehicle or the person near the driving road at which the ego vehicle is positioned by using the front detection sensor (i.e., the front camera sensor mounted on the front surface of the vehicle, etc.) and the side detection sensor (i.e., the side camera sensor mounted on the side surface of the vehicle, etc.). In addition, the processor 110 measures a location of the identified other vehicle or person through the side detection sensor (i.e., the side radar sensor mounted on the side surface of the vehicle, etc.), and monitors a path in which the identified other vehicle or person moves per time to predict a movement path of the identified other vehicle or person for a future predetermined time.

In this case, when the start of the ego vehicle is turned off, the processor 110 may store surrounding object information corresponding to a time when the start of the ego vehicle is turned off. In addition, when the ego vehicle is restarted, the processor 110 may acquire the surrounding object information by loading the stored surrounding object information without separately performing an operation of acquiring the surrounding object information for the surrounding object positioned near the ego vehicle. Meanwhile, the processor 110 may also perform a storage operation of the surrounding object information and a load operation of the surrounding object information only when the surrounding object information corresponding to the time when the start of the ego vehicle is turned off is the surrounding object information for the road boundary structure.

Then, the processor 110 may determine a collision risk between the ego vehicle and the surrounding object based on the movement prediction path information and the surrounding object information (S140).

That is, the processor 110 may determine whether there is a risk that the ego vehicle will collide with the surrounding object in the future by using surrounding object information for a surrounding object closest to the ego vehicle based on the movement prediction path information for each of the left surface and the right surface of the ego vehicle. For example, the processor 110 monitors an amount in which the ego vehicle and the surrounding object are close to each other per time for a predetermined time to determine whether there is the risk that the ego vehicle and the surrounding object will collide with each other after a future predetermined time.

When described in more detail, when the surrounding object closest to the ego vehicle is positioned at a left side of the ego vehicle, the processor 110 may determine whether there is the risk that the ego vehicle will collide with the surrounding object in the future based on the movement prediction path information and the surrounding object information for the left surface of the ego vehicle. Further, when the surrounding object closest to the ego vehicle is positioned at a right side of the ego vehicle, the processor 110 may determine whether there is the risk that the ego vehicle will collide with the surrounding object in the future based on the movement prediction path information and the surrounding object information for the right surface of the ego vehicle.

In this case, when the surrounding object closest to the ego vehicle is positioned at the left side of the ego vehicle, the processor 110 may determine whether there is the risk that the ego vehicle will collide with the surrounding object in the future based on the movement prediction path information and the surrounding object information on the left surface of the ego vehicle when the ego vehicle turns in a left direction, and determine that there is no collision risk without separately determining whether there is the risk that the ego vehicle will collide with the surrounding object in the future when the ego vehicle turns in a right direction. Further, when the surrounding object closest to the ego vehicle is positioned at the right side of the ego vehicle, the processor 110 may determine whether there is the risk that the ego vehicle will collide with the surrounding object in the future based on the movement prediction path information and the surrounding object information on the right surface of the ego vehicle when the ego vehicle turns in the right direction, and determine that there is no collision risk without separately determining whether there is the risk that the ego vehicle will collide with the surrounding object in the future when the ego vehicle turns in the left direction.

Thereafter, when it is determined that there is the collision risk between the ego vehicle and the surrounding object (S150-Y), the processor 110 may actuate a braking device of the ego vehicle (S160).

In this case, the processor 110 may control the braking device so that an actuation of the braking device and a non-actuation of the braking device are alternately repeatedly made in order for the ego vehicle to perform turning driving softly.

Meanwhile, when it is determined that there is the collision risk between the ego vehicle and the surrounding object while the braking device of the ego vehicle is actuated, the processor 110 may additionally actuate the rear wheel steering device of the ego vehicle. For example, a time to collision (TTC) used for determining the collision risk between the ego vehicle and the surrounding object may be set to be distinguished according to whether the braking device of the ego vehicle being actuated. Further, the time to collision (TTC) used for determining the collision risk between the ego vehicle and the surrounding object while the braking device of the ego vehicle is actuated may be varied according to a speed of the ego vehicle. As a result, the driver may recognize a fact that there is a risk of colliding with an object positioned at a rear side of the ego vehicle through the actuation of the braking device of the ego vehicle.

In this case, the processor 110 may actuate the rear wheel steering device so that a rear wheel direction of the ego vehicle is opposite to a front wheel direction of the ego vehicle. Further, the processor 110 may actuate the rear wheel steering device based on a predetermined rear wheel steering angle at a level at which there will be no problem in a behavior of the ego vehicle.

Then, an example of the method for avoiding a collision of a vehicle according to an embodiment of the present disclosure will be described with reference to FIGS. 3 to 7.

Figure 3:
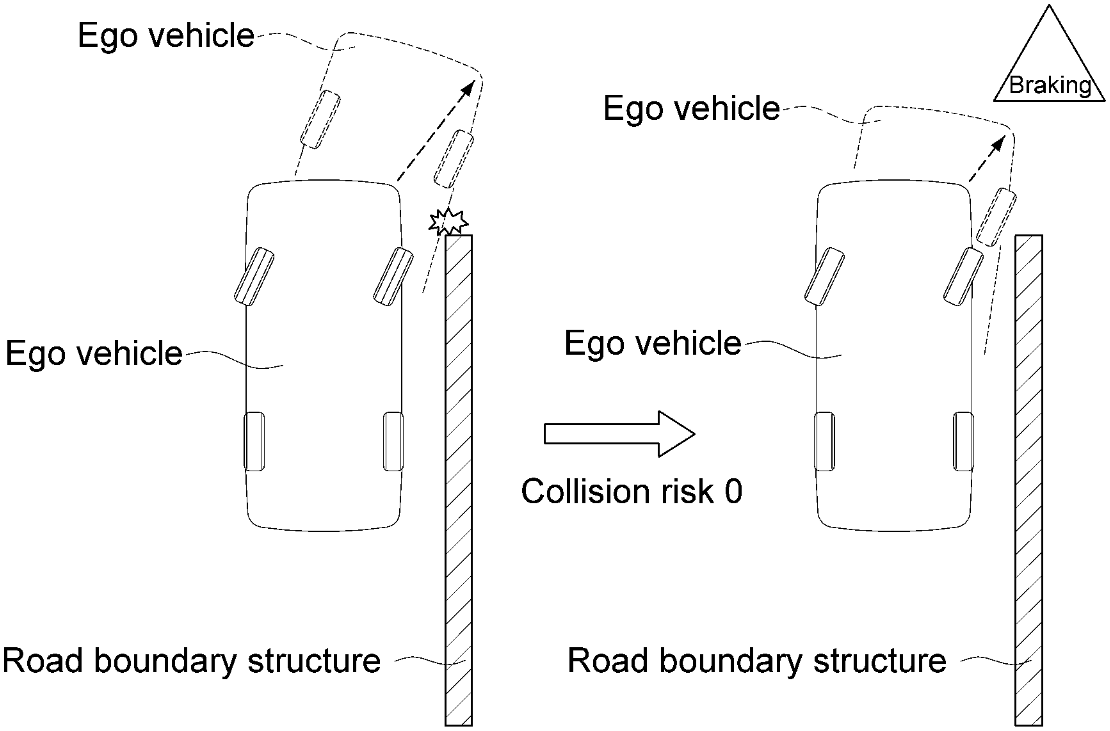
FIG. 3 is a diagram for describing an example of an operation of avoiding a collision between an ego vehicle and a road boundary structure according to an embodiment of the present disclosure.

FIG. 3 is a diagram for describing an example of an operation of avoiding a collision between an ego vehicle and a road boundary structure according to an embodiment of the present disclosure.

Referring to FIG. 3, in a situation in which the road boundary structure is positioned at the right side of the ego vehicle, when the ego vehicle turns in the right direction, the apparatus 100 may determine whether there is the risk that the ego vehicle will collide with the road boundary structure in the future based on the movement prediction path information for the right surface of the ego vehicle and the surrounding object information (a location and a height of the road boundary structure) for the road boundary structure.

In addition, when it is determined that there is the risk that the ego vehicle will collide with the road boundary structure, the apparatus 100 actuates the braking device of the ego vehicle to prevent the ego vehicle from colliding with the road boundary structure.

Figure 4:
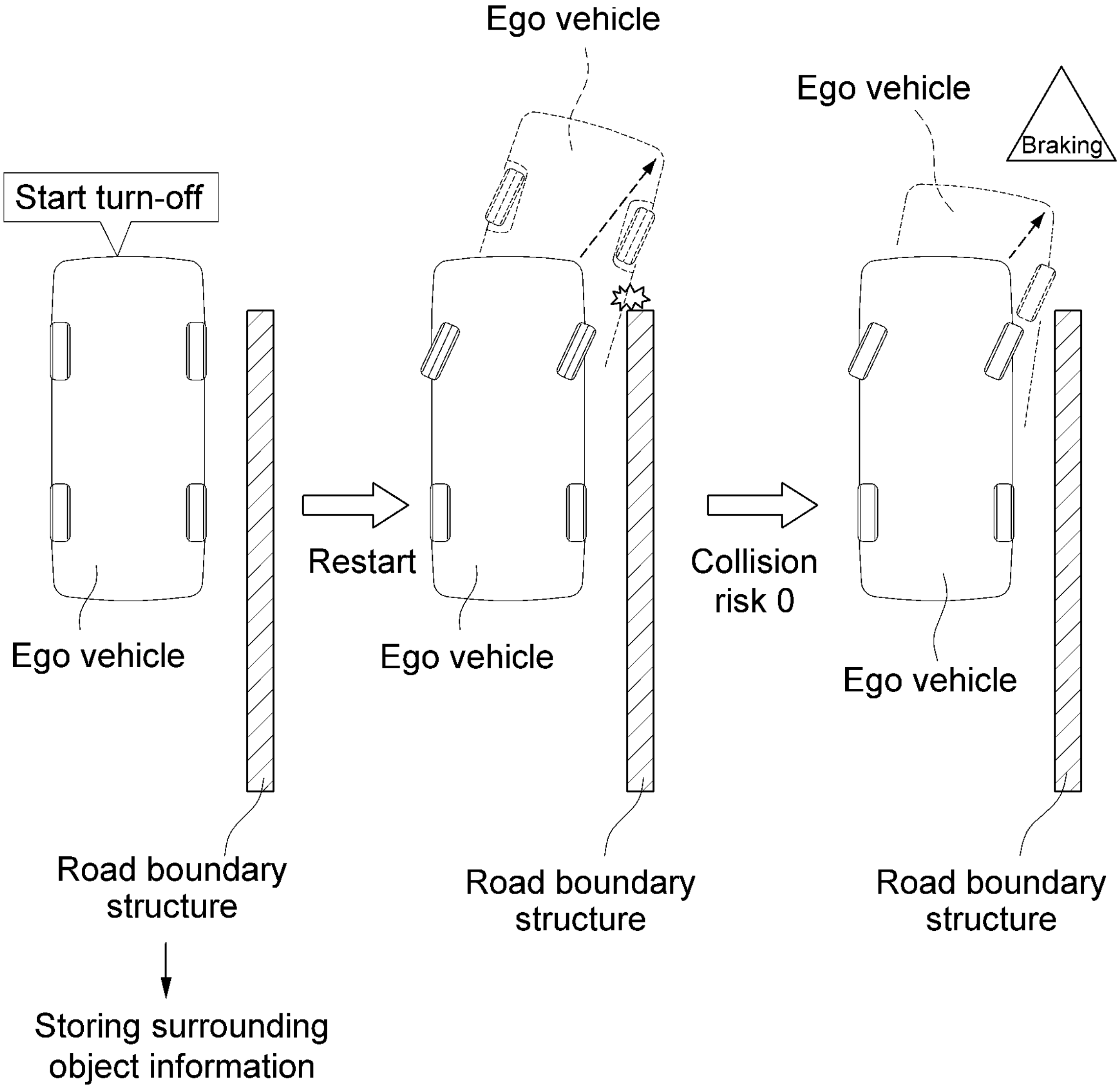
FIG. 4 is a diagram for describing an example of an operation of avoiding the collision between the ego vehicle and the road boundary structure upon restarting of the ego vehicle according to an embodiment of the present disclosure.

FIG. 4 is a diagram for describing an example of an operation of avoiding the collision between the ego vehicle and the road boundary structure upon restarting of the ego vehicle according to an embodiment of the present disclosure.

Referring to FIG. 4, in a situation in which the road boundary structure is positioned at the right side of the ego vehicle, when the start of the ego vehicle is turned off, the apparatus 100 may store the surrounding object information (the location and the height of the road boundary structure) of the road boundary structure.

Thereafter, when the ego vehicle is restarted, the apparatus 100 may acquire the surrounding object information (the location and the height of the road boundary structure) for the road boundary structure by loading the stored surrounding object information without separately performing the operation of acquiring the surrounding object information for the road boundary structure positioned near the ego vehicle.

Then, when the ego vehicle turns in the right direction by a manipulation of the driver, the apparatus 100 may determine whether there is a risk that the ego vehicle will collide with the road boundary structure in the future based on the movement prediction path information for the right surface of the ego vehicle and the surrounding object information (the location and the height of the road boundary structure) for the road boundary structure.

In addition, when it is determined that there is the risk that the ego vehicle will collide with the road boundary structure, the apparatus 100 actuates the braking device of the ego vehicle to prevent the ego vehicle from colliding with the road boundary structure.

Figure 5:
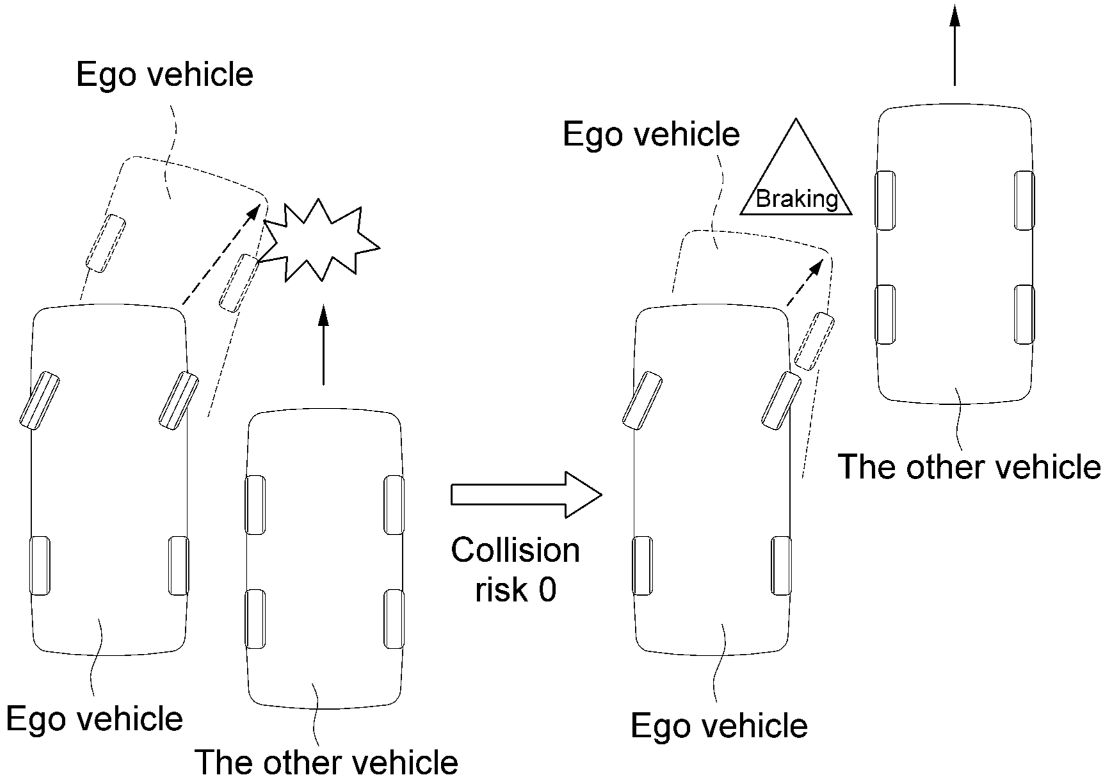
FIG. 5 is a diagram for describing an example of an operation of avoiding a collision between the ego vehicle and the other vehicle according to an embodiment of the present disclosure.

FIG. 5 is a diagram for describing an example of an operation of avoiding a collision between the ego vehicle and the other vehicle according to an embodiment of the present disclosure.

Referring to FIG. 5, in a situation in which the other vehicle is positioned at the right side of the ego vehicle, when the ego vehicle turns in the right direction, the apparatus 100 may determine whether there is a risk that the ego vehicle will collide with the other vehicle in the future based on the movement prediction path information for the right surface of the ego vehicle and surrounding object information (a future movement path of the other vehicle) for the other vehicle.

In addition, when it is determined that there is the risk that the ego vehicle will collide with the other vehicle, the apparatus 100 actuates the braking device of the ego vehicle to prevent the ego vehicle from colliding with the other vehicle.

Figure 6:
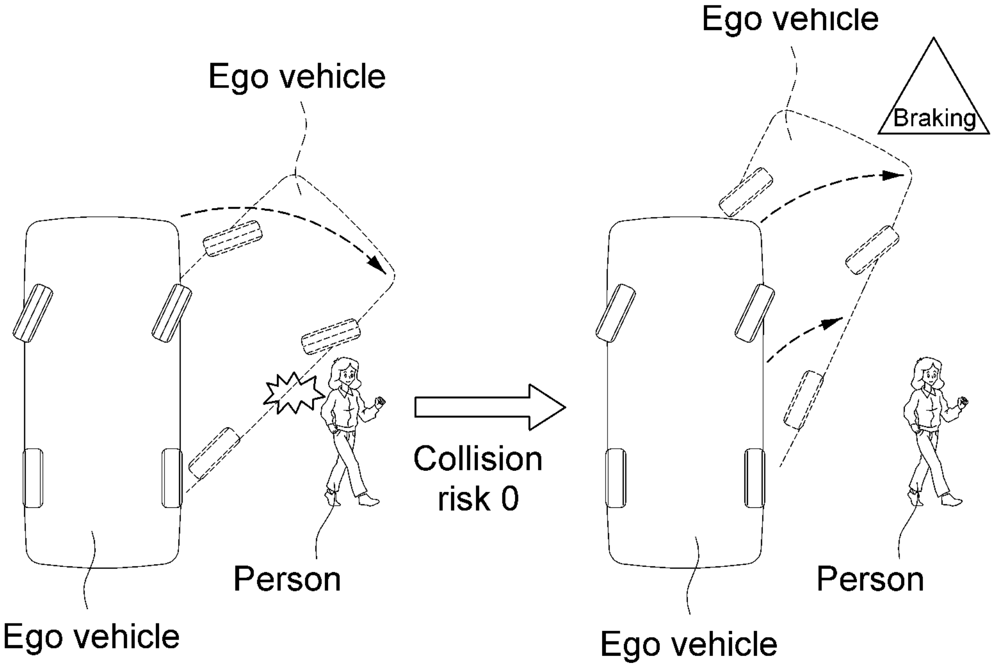
FIG. 6 is a diagram for describing an example of an operation of avoiding a collision between the ego vehicle and a person according to an embodiment of the present disclosure.

FIG. 6 is a diagram for describing an example of an operation of avoiding a collision between the ego vehicle and a person according to an embodiment of the present disclosure.

Referring to FIG. 6, in a situation in which the person is positioned at the right side of the ego vehicle, when the ego vehicle turns in the right direction, the apparatus 100 may determine whether there is a risk that the ego vehicle will collide with the person in the future based on the movement prediction path information for the right surface of the ego vehicle and surrounding object information (a future movement path of the person) for the person.

In addition, when it is determined that there is the risk that the ego vehicle will collide with the person, the apparatus 100 actuates the braking device of the ego vehicle to prevent the ego vehicle from colliding with the person.

Figure 7:
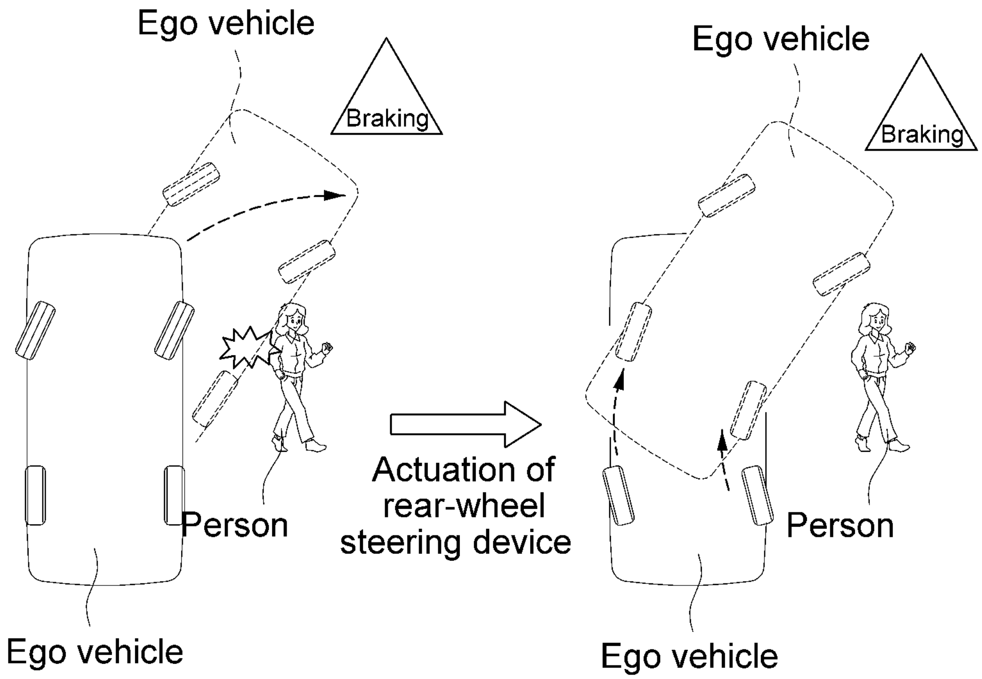
FIG. 7 is a diagram for describing an example of an operation of actuating a rear wheel steering device of the ego vehicle in order to additionally avoid the collision between the ego vehicle and the person during actuating a braking device of the ego vehicle for avoiding the collision between the ego vehicle and the person according to an embodiment of the present disclosure.

FIG. 7 is a diagram for describing an example of an operation of actuating a rear wheel steering device of the ego vehicle in order to additionally avoid the collision between the ego vehicle and the person during actuating a braking device of the ego vehicle for avoiding the collision between the ego vehicle and the person according to an embodiment of the present disclosure.

Referring to FIG. 7, it is determined that there is the risk that the ego vehicle will collide with the person, and while the braking device of the ego vehicle is actuated, the apparatus 100 may additionally determine whether there is the risk that the ego vehicle will collide with the persons in the future based on the movement prediction path information for the right surface of the ego vehicle and the surrounding object information (the future movement path of the person) for the person.

In addition, when it is determined that there is the risk that the ego vehicle will collide with the person, the apparatus 100 additionally actuates the rear wheel steering device of the ego vehicle so that the front wheel direction of the ego vehicle is opposite to the front wheel direction of the ego vehicle to prevent the ego vehicle from colliding with the person.

The operations according to the embodiments of the present disclosure described above are implemented in a form of a program command which may be performed through various computer means and may be recorded in the computer-readable storage medium. The computer-readable storage medium represents any medium that participates in providing instructions to a processor for execution. The computer-readable storage medium may include a program command, a data file, or a data structure or a combination thereof. For example, the computer-readable storage medium may include a magnetic medium, an optical recording medium, a memory, and the like. A computer program may be distributed on a networked computer system so that a computer readable code may be stored and executed in a distributed manner. Functional programs, codes, and code segments for implementing the embodiments of the present disclosure may be easily inferred by programmers in the art to which the embodiments of the present disclosure belong.

The embodiments of the present disclosure are for describing the technical spirit of the embodiments, and the scope of the technical spirit of the embodiment is not limited by the embodiment of the present disclosure. The protection scope of the embodiments of the present disclosure should be interpreted by the appended claims and all technical spirit in the equivalent range thereto should be interpreted to be embraced by the claims of the embodiment of the present disclosure.

What is claimed is:

1. A method for avoiding a collision of a vehicle, the method comprising:

acquiring, when an ego vehicle turns, movement prediction path information for a side surface of the ego vehicle;

acquiring surrounding object information for a surrounding object positioned near the ego vehicle;

determining a collision risk between the ego vehicle and the surrounding object based on the movement prediction path information and the surrounding object information; and actuating a braking device of the ego vehicle when it is determined that there is the collision risk between the ego vehicle and the surrounding object, wherein the acquiring of the movement prediction path information is made by predicting a movement radius of the ego vehicle based on a sensor signal of the ego vehicle, and acquiring the movement prediction path information for each of a left surface and a right surface of the ego vehicle by using specification information of the ego vehicle based on the movement radius, wherein the determining of the collision risk is made by determining whether there is a risk that the ego vehicle will collide with the surrounding object in the future by using the surrounding object information for the surrounding object closest to the ego vehicle based on the movement prediction path information for each of a left surface and a right surface of the ego vehicle, wherein the determining of the collision risk is made by determining, when the surrounding object closest to the ego vehicle is positioned at a left side of the ego vehicle, whether there is the risk that the ego vehicle will collide with the surrounding object in the future based on the movement prediction path information and the surrounding object information for the left surface of the ego vehicle, and determining, when the surrounding object closest to the ego vehicle is positioned at a right side of the ego vehicle, whether there is the risk that the ego vehicle will collide with the surrounding object in the future based on the movement prediction path information and the surrounding object information for the right surface of the ego vehicle, wherein the determining of the collision risk is made by determining, when the surrounding object closest to the ego vehicle is positioned at the left side of the ego vehicle, whether there is the risk that the ego vehicle will collide with the surrounding object in the future based on the movement prediction path information and the surrounding object information for the left surface of the ego vehicle when the ego vehicle turns in a left direction, and determining that there is no collision risk without separately determining whether there is the risk that the ego vehicle will collide with the surrounding object in the future when the ego vehicle turns in a right direction, and determining, when the surrounding object closest to the ego vehicle is positioned at the right side of the ego vehicle, whether there is the risk that the ego vehicle will collide with the surrounding object in the future based on the movement prediction path information and the surrounding object information for the right surface of the ego vehicle when the ego vehicle turns in the right direction, and determining that there is no collision risk without separately determining whether there is the risk that the ego vehicle will collide with the surrounding object in the future when the ego vehicle turns in the left direction.

2. The method of claim 1, wherein the acquiring of the surrounding object information is made by acquiring the surrounding object information through a front detection sensor and a side detection sensor mounted on the ego vehicle.

3. The method of claim 2, wherein the acquiring of the surrounding object information is made by identifying a road boundary structure which is the surrounding object by using the front detection sensor and the side detection sensor, and acquiring the surrounding object information including a location and a height for the identified road boundary structure.

4. The method of claim 2, wherein the acquiring of the surrounding object information is made by identifying the other vehicle or a person which is the surrounding object by using the front detection sensor and the side detection sensor, and acquiring the surrounding object information including a future movement path of the other vehicle or the person which is identified.

5. The method of claim 1, wherein the acquiring of the surrounding object information is achieved by storing the surrounding object information corresponding to a time when a start of the ego vehicle is turned off when the start of the ego vehicle is turned off, and acquiring, when the ego vehicle is restarted, the surrounding object information by loading the stored surrounding object information without separately performing an operation of acquiring the surrounding object information for the surrounding object positioned near the ego vehicle.

6. The method of claim 1, wherein the actuating of the braking device is made by additionally actuating a rear wheel steering device of the ego vehicle when it is determined that there is the collision risk between the ego vehicle and the surrounding object.

7. The method of claim 6, wherein the actuating of the braking device is made by actuating the rear wheel steering device so that a rear wheel direction of the ego vehicle is opposite to a front wheel direction of the ego vehicle.

8. An apparatus comprising:

a memory storing one or more programs for avoiding a collision of a vehicle; and one or more processors performing an operation of avoiding the collision of the vehicle according to one or more programs stored in the memory, wherein the processor acquires, when an ego vehicle, movement prediction path information for a side surface of the ego vehicle, acquires surrounding object information for a surrounding object positioned near the ego vehicle, determines a collision risk between the ego vehicle and the surrounding object based on the movement prediction path information and the surrounding object information, and actuates a braking device of the ego vehicle when it is determined that there is the collision risk between the ego vehicle and the surrounding object, wherein the processor predicts a movement radius of the ego vehicle based on a sensor signal of the ego vehicle, and acquires the movement prediction path information for each of a left surface and a right surface of the ego vehicle by using specification information of the ego vehicle based on the movement radius, wherein the processor determines whether there is the risk that the ego vehicle will collide with the surrounding object in the future by using the surrounding object information for the surrounding object closest to the ego vehicle based on the movement prediction path information for each of the left surface and the right surface of the ego vehicle, wherein the processor determines, when the surrounding object closest to the ego vehicle is positioned at a left side of the ego vehicle, whether there is the risk that the ego vehicle will collide with the surrounding object in the future based on the movement prediction path information and the surrounding object information for the left surface of the ego vehicle, and determines, when the surrounding object closest to the ego vehicle is positioned at a right side of the ego vehicle, whether there is the risk that the ego vehicle will collide with the surrounding object in the future based on the movement prediction path information and the surrounding object information for the right surface of the ego vehicle, wherein the processor determines, when the surrounding object closest to the ego vehicle is positioned at the left side of the ego vehicle, whether there is the risk that the ego vehicle will collide with the surrounding object in the future based on the movement prediction path information and the surrounding object information for the left surface of the ego vehicle when the ego vehicle turns in a left direction, and determines that there is no collision risk without separately determining whether there is the risk that the ego vehicle will collide with the surrounding object in the future when the ego vehicle turns in a right direction, and determines, when the surrounding object closest to the ego vehicle is positioned at the right side of the ego vehicle, whether there is the risk that the ego vehicle will collide with the surrounding object in the future based on the movement prediction path information and the surrounding object information on the right surface of the ego vehicle when the ego vehicle turns in the right direction, and determines that there is no collision risk without separately determining whether there is the risk that the ego vehicle will collide with the surrounding object in the future when the ego vehicle turns in the left direction.

9. The apparatus of claim 8, wherein the processor acquires the surrounding object information through a front detection sensor and a side detection sensor mounted on the ego vehicle.

10. The apparatus of claim 9, wherein the processors identifies a road boundary structure which is the surrounding object by using the front detection sensor and the side detection sensor, and acquires the surrounding object information including a location and a height for the identified road boundary structure.

11. The apparatus of claim 9, wherein the processor identifies the other vehicle or a person which is the surrounding object by using the front detection sensor and the side detection sensor, and acquires the surrounding object information including a future movement path of the other vehicle or the person which is identified.

12. The apparatus of claim 8, wherein the processor stores the surrounding object information corresponding to a time when a start of the ego vehicle is turned off when the start of the ego vehicle is turned off, and acquires, when the ego vehicle is restarted, the surrounding object information by loading the stored surrounding object information without separately performing an operation of acquiring the surrounding object information for the surrounding object positioned near the ego vehicle.

* * * * *